United States Patent [19]

Kyker

[11] 4,373,683

[45] Feb. 15, 1983

[54] SNAP-IN SELF-CENTERING MECHANISM BUTTON

[75] Inventor: Robert A. Kyker, Collinsville, Okla.

[73] Assignee: Brunswick Corporation, Skokie, Ill.

[21] Appl. No.: 88,032

[22] Filed: Oct. 25, 1979

[51] Int. Cl.³ ............................................. A01K 89/01
[52] U.S. Cl. ................................. 242/84.21 R; 24/96;
24/101 R; 74/577 R; 188/82.3; 242/84.51 A
[58] Field of Search ................ 242/84.21 R, 84.2 G,
242/84.21 A, 84.2 B, 84.51 A, 84.5 A;
188/82.3; 24/96, 100, 101 R; 74/577 R, 577 S

[56] References Cited

U.S. PATENT DOCUMENTS

| 2,773,655 | 12/1956 | Mandolf | 242/84.21 R |
|---|---|---|---|
| 3,039,716 | 6/1962 | Visockis | 242/84.2 B |
| 3,499,613 | 3/1970 | Sarah | 242/84.21 R |
| 3,946,963 | 3/1976 | Oberg | 242/84.21 R |
| 4,215,828 | 8/1980 | Rathbun et al. | 242/84.8 |

Primary Examiner—Billy S. Taylor
Attorney, Agent, or Firm—John G. Heimovics

[57] ABSTRACT

This invention comprehends a button mounted in the rear portion of the spinning style fishing reel to operate a self-centering bail mechanism. The button includes a cantilever spring arm that cooperates with recesses formed in the button mounting passage. Biasing means are incorporated within the button to prevent it from inadvertently sliding back and forth.

45 Claims, 14 Drawing Figures

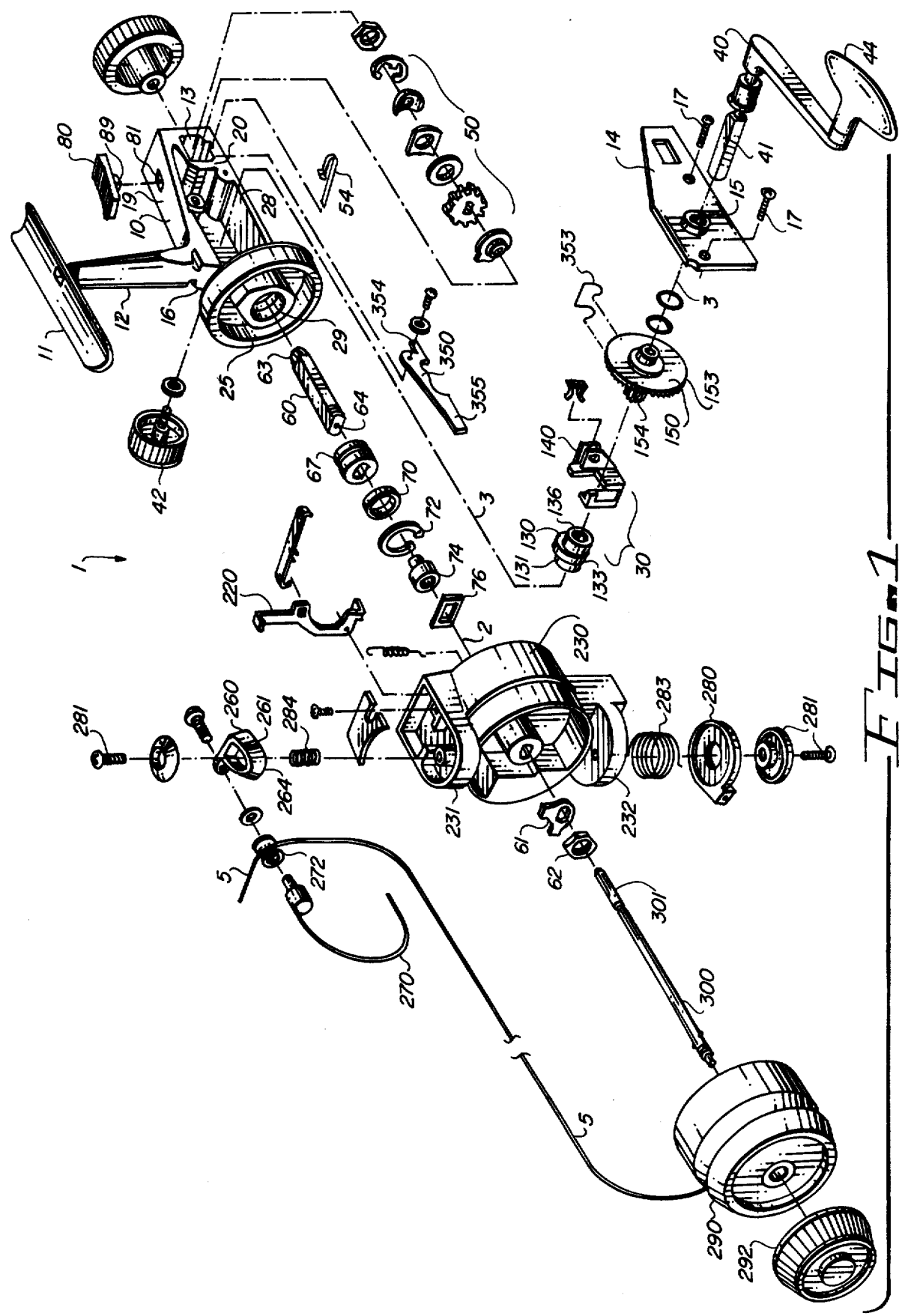

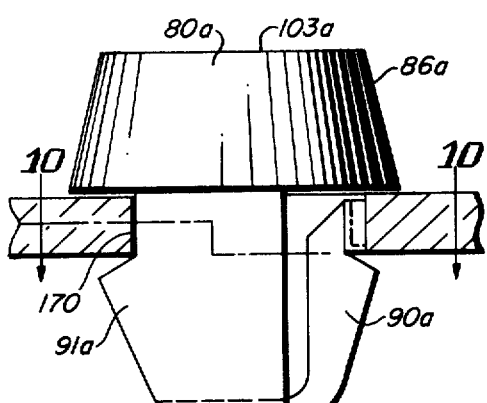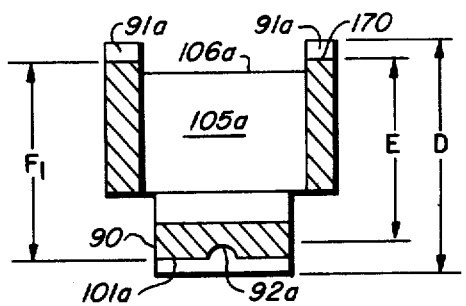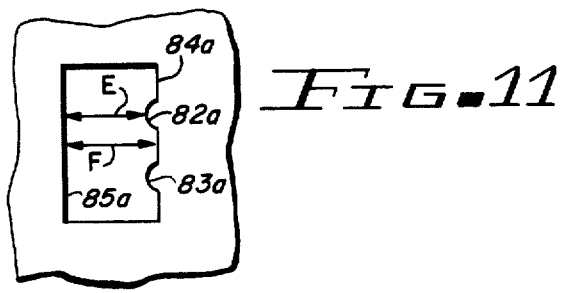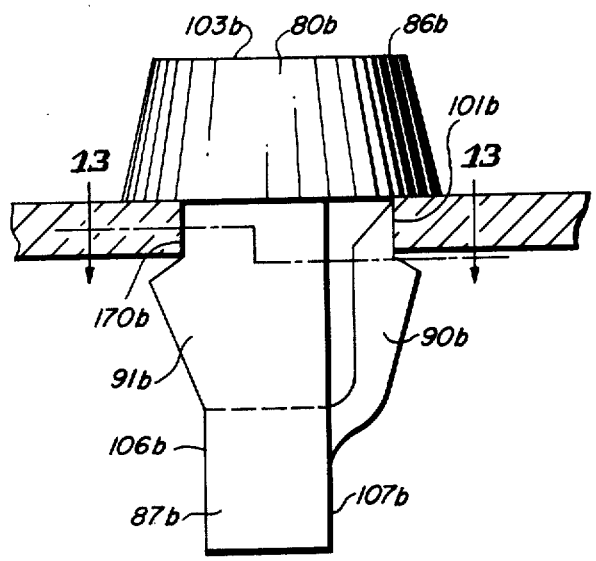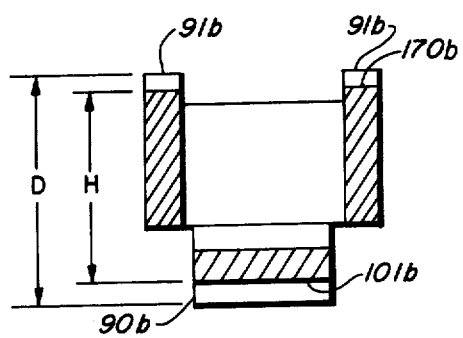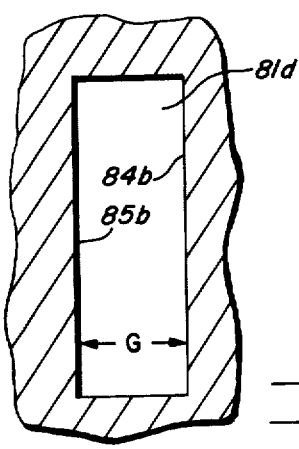

SNAP-IN SELF-CENTERING MECHANISM BUTTON

BACKGROUND OF THE INVENTION

1. Field of the Invention

This invention relates to spinning style fishing reels, and more particularly, relates to a button mounted on the back of the fishing reel that is used to place into, and take out of, operation a mechanism that repetitively positions the bail of the fishing reel in the most desirable casting position.

2. Background of Prior Art

It is well known in the prior art that it is possible to incorporate an anti-reverse and self-centering bail mechanism into a spinning style fishing reel. This particular type of mechanism was first employed by the Langley Manufacturing Company about twenty years ago and was incorporated inside the rotor cup and external to the gear housing of the fishing reel. The Langley device had limited use and constantly caused a problem for fishermen in that in order to use the device a fisherman would have to get his hands in the way of the fishing line. It became obvious that if this desirable self-centering and anti-reverse feature could be incorporated so that it could be operated from the back portion of the fishing reel, it would be quite advantageous. Most spinning reels were made thereafter incorporating the anti-reverse mechanism that was operated from the rear of the fishing reel but they did not incorporate the self-centering bail feature. Normally the means for operating the anti-reverse feature was to have a small shaft that would toggle from the right to the left located at the back of the reel, but it was never a very positive mechanism.

The recent prior art of U.S. patent application Ser. No. 932,848, filed Aug. 11, 1978, and now abandoned, by J. W. Puryear and assigned to the assignee hereof, teaches a handy button means for making such an anti-reverse and self-centering bail mechanism operable. However, the fishing reels made using the Puryear mechanism relies on a spring loaded button and a detent under the button head to keep the button in either the front or back position. It has been found that in pressing down on the button to slide it forward or backward, the button head hangs up on the detent making it difficult to slide.

As found in the prior art, leaf-type springs are generally used as keepers and provide spring tension for the buttons. It has been found difficult and very time-consuming to install such leaf springs. Additionally, it has been found quite perplexing and disheartening to try to disassemble a fishing reel to clean it out only to have the button spring pop out from the reel housing and be lost somewhere due to the fact that it is small in size and blends well with almost every environment.

SUMMARY OF THE INVENTION

This invention relates to a spinning style fishing reel that incorporates a self-contained, internally spring loaded button that is located at the back and within the gear housing of a fishing reel to energize the anti-reverse and self-centering bail mechanism. By locating the mechanism in the gear housing, the button means for bringing it into operation can be located at the back of the reel out of the way of the fishing line.

It is therefore an object of this invention to provide a self-contained sliding button located within the fishing reel housing to operate the anti-reverse and self-centering mechanism.

Another object of this invention is to provide a button that incorporates a self-contained spring loaded mechanism.

Yet another object of this invention is to provide a simple sliding button arrangement which is always under spring tension.

Still another object of this invention is to provide a housing that is fashioned to accept and incorporate such a button.

Another object of this invention is to provide such a simple sliding button arrangement with an associated plate that can be used in many different applications besides a fishing reel environment.

Still another object of this invention is to provide such a simple sliding button arrangement that can be used in a plate having a plurality of pre-selected positions.

Still yet another object of this invention is to provide such a sliding button that can be used in a plate having a plurality of positions that are arbitrarily selected and where such arrangement can be adapted in a structure such as an elongated sliding rheostat.

The above and other and further objects and features will be more readily understood by reference to the following detailed description and the accompanying drawings.

DESCRIPTION OF THE DRAWINGS

FIG. 1 is an exploded perspective view of a spinning style fishing reel containing the invention described herein;

FIG. 9 is an end view elevation of another embodiment of the invention herein;

FIG. 10 is a cross sectional view taken along line 10—10 of FIG. 9 depicting a portion of one embodiment of the invention hereof;

FIG. 11 is a top view of a plate configuration adapted to receive the invention depicted in FIG. 9;

FIG. 12 is an end view elevation of yet another embodiment of the invention herein;

FIG. 13 is a cross sectional view taken along line 13—13 of FIG. 12 depicting a portion of one embodiment of the invention hereof; and, FIG. 14 is a top view of a plate configuration adapted to receive the invention depicted in FIG. 12.

DESCRIPTION OF BASIC STRUCTURE AND OPERATION OF FISHING REEL

Figure 4:
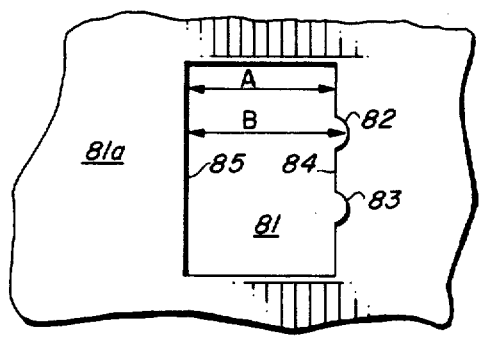
FIG. 4 is a top view of a plate configuration adapted to receive the invention hereof.

In FIG. 1 an open face style fishing reel 1 is shown in an exploded perspective view. The reel 1 having a housing 10 which includes an integral gear case 28, a stem 12 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish is on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle 41 with the drive shaft 154 externally mounted in the side plate bearing 15 and the bearing collar 131 mounted in bearing 16 that is part of the side of the housing 10 and coaxial with bearing 15 (but not shown in FIG. 1). Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever 76 are mounted on the pinion 60. The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis 2 of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 90 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A feature of this fishing reel is a self-centering bail mechanism that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENTS

Figure 2:
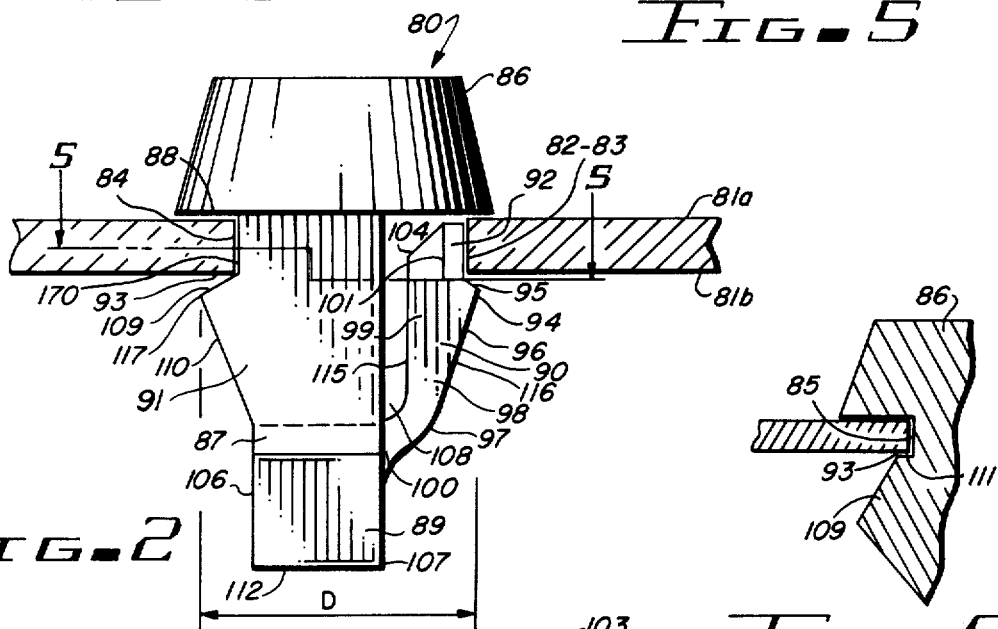
FIG. 2 is an end view elevation of one embodiment of the invention herein.
Figure 3:
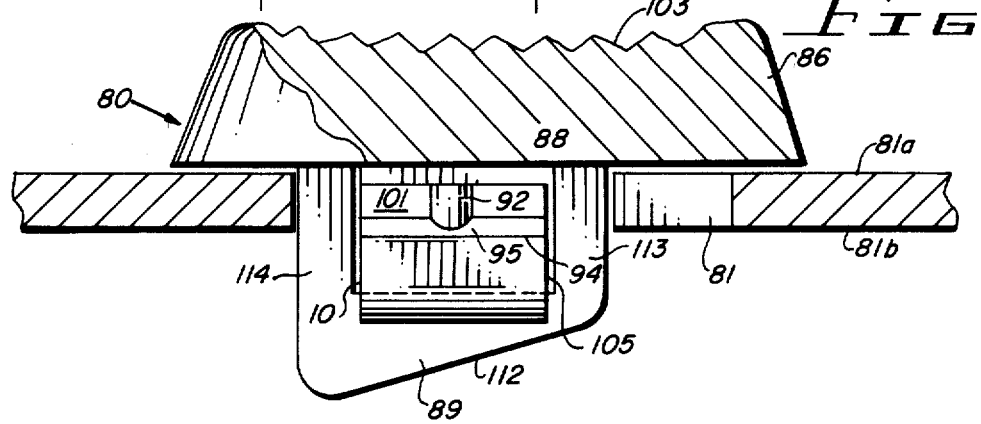
FIG. 3 is a side view elevation of one embodiment of the invention herein.

In a preferred embodiment of the invention, a simple button 80 having an integrally formed cantilever arm means 90 and an oppositely positioned wedge means 91 fits into a rectangular opening 81 in the back of the housing 10 or in any device with a rectangular opening such as 81. As seen in FIGS. 2 and 3, the button 80 has a head 86 and a lower portion 87 which is attached to or integral with the head 86 at a top 88. The lower portion 87 has a base 89 that can have a lower cam surface 112 fashioned in any manner desired. The lower portion 87 has a first longitudinal wall 106 and a second longitudinal wall 107. On the wall 106 is the wedge means 91 having an upper wedge face 109 and a lower wedge face 110 that meet in an outwardly projecting edge 117 which is substantially parallel to the top 88. On the opposite second wall 107 is the cantilever arm means 90 having a cross-sectional configuration of a J-shaped arm designated 98 and having an upper projecting leg 99 and a lower foot 100 securing the arm 98 to the lower portion 87; the arm 98 arranged as a cantilever spring means extending from the base 89. The leg 100 has an internal area 115 adjacent to and facing the second wall 107 and separated by longitudinal space 108 and an external area 116 has a lower tapered rail surface 96 and an upper tapered rail surface 95 meeting in a rail 94 which is substantially parallel to the top 88 and projects outwardly from the second wall 107, leg 99 and the external area 116. Projecting upward is a small plane portion 101 that is positioned closer to the second wall 107 than is the rail 94. A nib 92 is mounted on the plane portion 101 and the upper tapered rail surface 95 and projecting outwardly from the second wall 107.

As shown in FIGS. 2, 3 and 4 the lower portion 87 is U-shaped having first and second side sections 113 and 114 secured to the head at the top 88 and forming a central opening 105. When the lower portion 87 is U-shaped, then two wedge means 91 are formed on the first wall 106 as shown in the cross-sectional view of FIG. 5. Alternatively, the lower portion 87 may be solid and thus having only one wedge means 91. The button 80 can be made from metal, wood, plastic, etc. as desired. Injection molding of the plastic button enables it to be easily formed of a tough and resilient material providing for a good resilient and elastic movement of the arm means 90 relative to the second wall 107.

Figure 6:
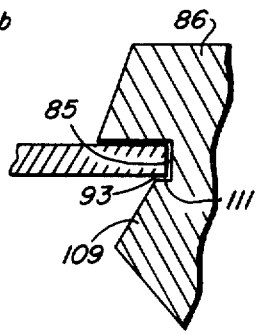
FIG. 6 is a partial sectional view of another embodiment of the invention depicting an undercut portion.

A top view of the rectangular opening 81 in which the button 80 is to be mounted is shown in FIG. 4. FIG. 4 can represent the opening 81 in the reel housing 10 or any opening in any plate in which the button 80 is to be mounted. However, in order for the button 80 to function properly the opening should be a rectangular opening in a plate or housing having an upper surface 81a and a lower surface 81b as shown in FIGS. 2, 3 and 6. The rectangular opening 81 has a first long side 84 and a second long side 85 with the first side 84 having two spaced apart recesses 82 and 83 that extend between the surfaces 81a and 81b. The catch means recesses 82 and 83 are shaped to accommodate the coupler means nip 92 therein. The lower surface 81b of the side 85 defines a seat 93. The space between upper wedge face 109 and the top 88 and the upper tapered rail surface 95 and the top 88 is slightly less than the thickness of the plate defined by the space between the surfaces 81a and 81b. The width of the rectangular opening 81 between the sides 84 and 85 is a dimension "A" and the width or dimension between the side 85 and the extremities of the recesses 82 or 83 is "B" which is obviously greater than "A."

Figure 5:
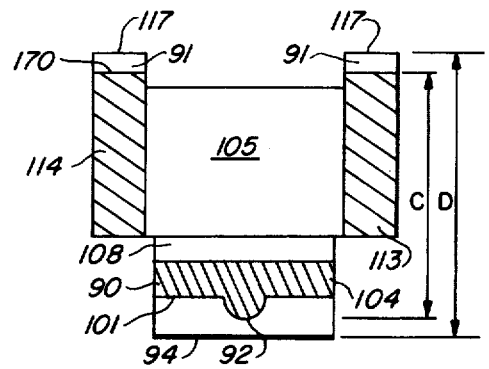
FIG. 5 is a sectional view taken along line 5—5 of FIG. 2 depicting a portion of one embodiment of the invention hereof.

As shown in FIG. 5, the distance between the edge 117 and the externally most projected part of the nib 92 is the dimension "C." The distance between the edge 117 and the rail 94 is "D" with "C" being at least equal to "B" but preferably larger than "B;" "D" being larger than "A," "B" or "C."

The button 80 is pressed into the opening 81 such that the nib 92 can be positioned in the recesses 82 and 83. In pushing the button 80 into the opening 81 the arm means 90 is forced inwardly toward the second wall 107 with the external surface 116 being depressed by rubbing against the side 84 and the lower wedge face 110 rubbing against the side 85. When the button 80 has been pushed sufficiently so that the upper wedge face 109 clears the seat 93 and the upper tapered rail surface 95 clears the lower surface 81b and the nib 92 can be received in the recesses 82 and 83, then the button is in place.

When the button 80 is slid to a first position the nib 92 seats in the recess 82 with the spring arm means 90 insuring that the button will remain in position. By pushing on the serrated surface 103 the button 80 can easily be slid to a second position where the nib 92 is received and held in the recess 83. Because the underside of the head is smooth and the top surface 81a of the plate surrounding the opening is also smooth, the button can be easily slid back and forth from the first position to the second position without hanging up. The integrally spring loaded arm means 90 creates an outward pressure against the sides 84 and 85.

The button 80 can be removed from the plate if the arm means 90 is forced inwardly toward the second wall 107 until the distance "D" is about "A" wherein the base 89 can be pushed toward the plate thereby removing the button 80 from the opening 81.

In an alternative embodiment of the invention, as shown in FIG. 6, the upper wedge face 109 and the undercut as shown at 111 to provide a more positive seat for the button 80. With the undercut 111 it has been found that the button 80 can be held more securely in the opening against the sides 84 and 85, but it has also been found it is more difficult to remove the button 80 from the opening 81.

It can be fully appreciated that the opening 81 can have a plurality of recesses similar to 82 and 83. Thus, the button in such an opening can slide back and forth from a plurality of positions, limited only by the number of positions provided on the plate into which the button 80 has been positioned.

Figure 7:
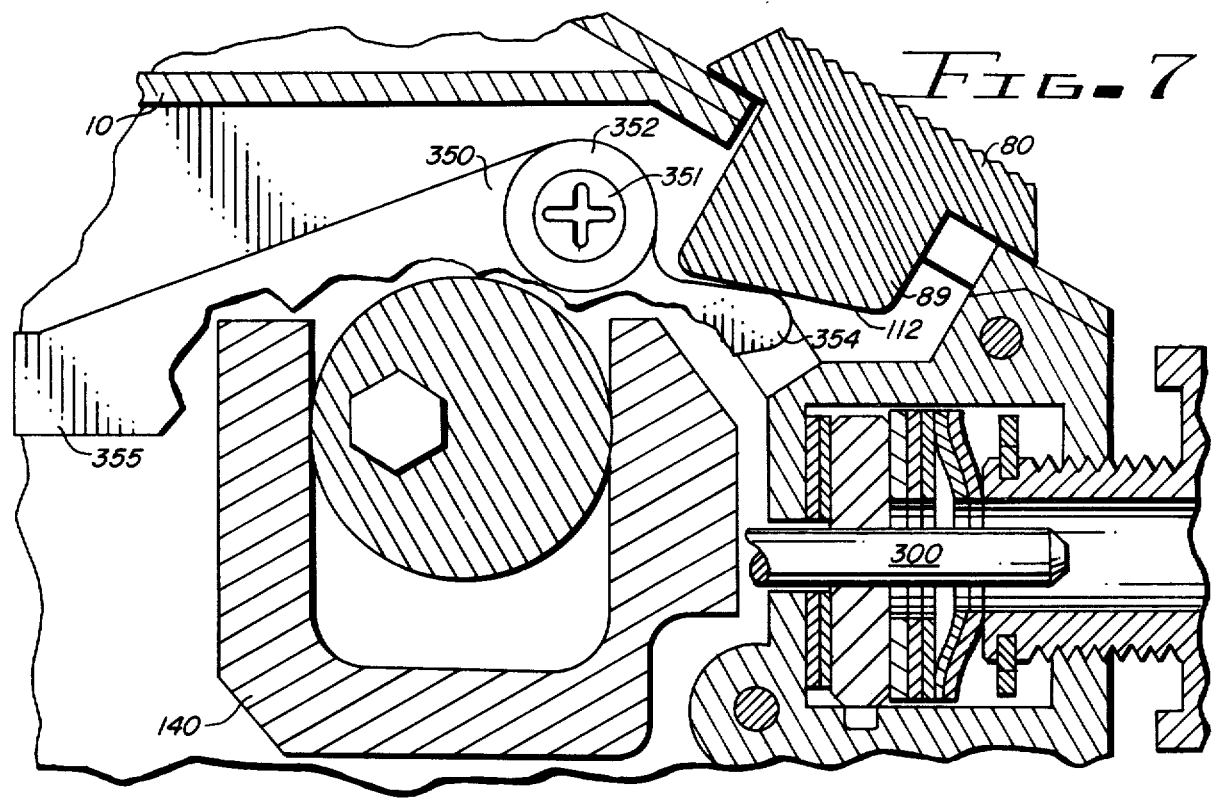
FIG. 7 is a side cutaway sectional view of a spinning style fishing reel with a portion of the button of this invention in contact with part of the self-centering bail mechanism of the reel whereby the mechanism is in an operational mode.
Figure 8:
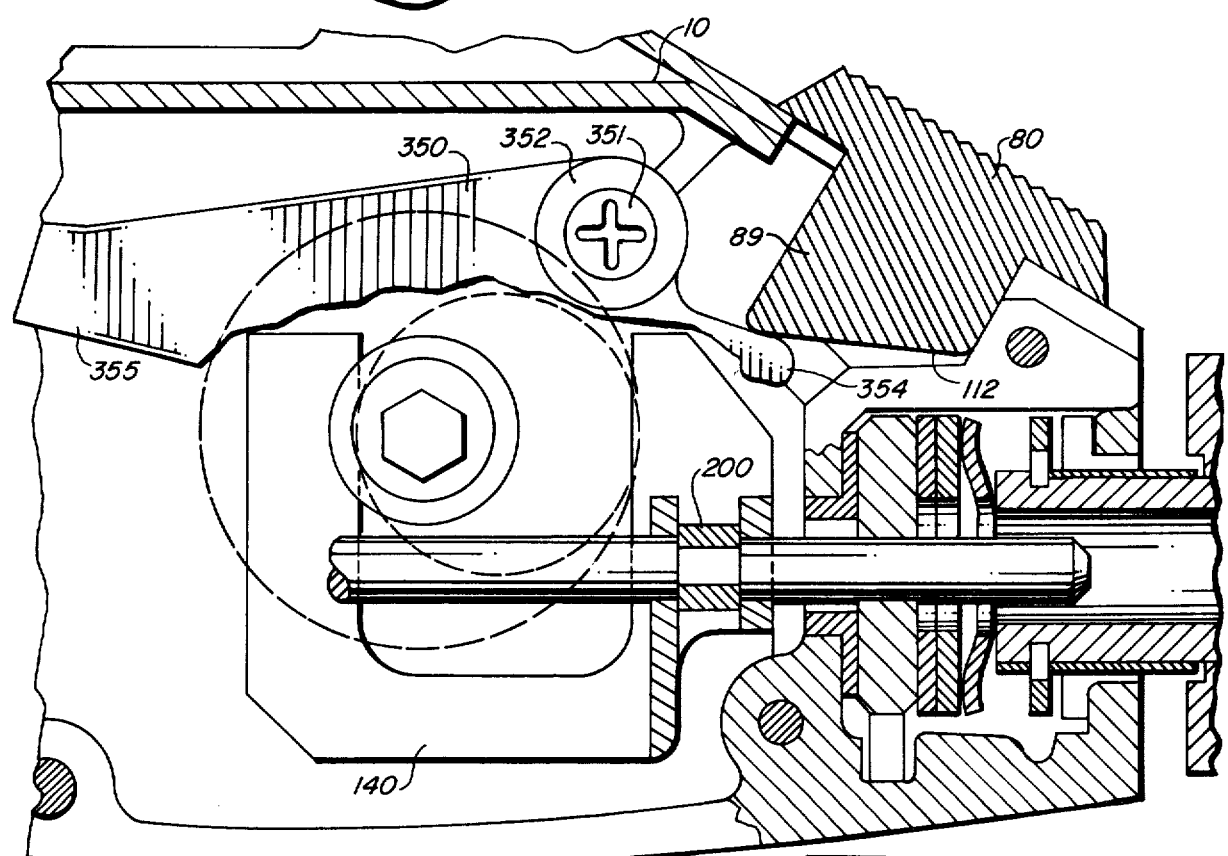
FIG. 8 is a side cutaway sectional view of the spinning reel depicted in FIG. 7 wherein the self-centering mechanism is disengaged and in a non-operational mode.

It is fully comprehended by this invention and as seen in FIGS. 7 and 8, the cam surface 112 is in operable engagement with the back end 354 of the lower arm 350. When the button 80 is in the forward position, as shown in FIG. 7, the pawl end 355 is lowered and able to engage the ratchet 67 (not shown). Conversely, when the button 80 is in the back position as shown in FIG. 8 the pawl end 355 is raised and cannot contact the ratchet 67 (not shown). Thus, by simply sliding the button 80 back and forth, the self-centering bail mechanism of reel 1 can become operational or disengaged, as desired.

In another embodiment of the invention shown in FIGS. 9 and 10, a button 80a with a head 86a and a lower portion 87a is shown. The lower portion 87a has wedge means 91a on a first longitudinal wall 106a and resilient arm means 90a on the second longitudinal wall 107a. The arm means 90a has a flat plane 101a near the top directed toward the head 86a with the plane 101a having a catch or recess 92a which is the reverse construction of the embodiment of the invention shown in FIG. 2. Rather than two recesses, as shown in FIG. 4, the passageway has coupler means or nibs 82a and 83a on longitudinal side 84a which is spaced from longitudinal side 85a. The catch and coupler can comprise a nib and a recess or a recess and a nib and be used interchangeably as depicted in FIGS. 2 and 9. The button 80a has a side step 170 under the head 86a parallel to the wall 106a with the step 170 mating with the passageway side 85a. The distance between the back of the recess 92a and the side step 170 is "E" and the distance from the coupler means or nibs 82a or 83a to the opposite side 85a is approximately "E." The overall width of the passageway is "F" and the width of the button 80a between the plane 101a and the side step 170 is "$F_1$" which is approximately equal to or slightly larger than "F."

When the button 80a is positioned in the passageway in the same fashion as button 80 is positioned in passageway 81, the button 80a can be slid to a first position where the recess 92a seats over the nib 82a with the spring arm means 90a insuring that the button will remain in position. By pushing the surface 103a, the button 80a can easily be slid to a second position where the nib 83a is received and held by the recess 92a. Because the underside of the head is smooth and the top surface surrounding the passageway is also smooth, the button 80a can be easily slid back and forth from the first position to the second position without hanging up. The integral spring loaded arm 90a creates an outward pressure against the sides 84a and 85a. The button 80a can be removed from the passageway in a manner similar to the method employed to remove the button 80 from the passageway 81.

In yet another embodiment of the invention shown in FIGS. 12 and 13, a button 80b has a head 86b and a lower portion 87b with resilient arm means 90a on the second longitudinal wall 107b and wedge means 91b on the first longitudinal wall 106b. The arm means 90b has an upwardly projecting plane 101b that is spaced a distance "H" from the side step 170a that is parallel to the wall 106a.

An elongated passageway 81d in a plate shown in FIG. 14 has two elongated sides 84b and 85b. The button 80b is positioned in the passageway 81d in a manner similar to the way in which button 80 is positioned in passageway 81. The width of the passageway 81d is "G" which is less than the distance "H" and therefore when the button 80b is positioned in a passageway 81d, the side step 170b and the plane 101b are seated always pushing outwardly against the sides 84b and 85b because of the spring arm means 90b. By pushing on the top surface 103b, the button 80b can be slid from one position to another in the passageway 81d with the frictional engagement between the step 170b and the plane 101b and the sides 84b and 85b always holding the button 80b in place. Because the underside of the head is smooth similar to buttons 80 and 80a and the top surface surrounding the passageway is also smooth, the button 80b easily slides back and forth without hangup.

The frictional arrangement provides an unlimited plurality of positions for the button 80b in the passageway 81d with such a configuration adapted to be utilized in a sliding rheostat. The button 80b can be removed from the passageway in a manner similar to the method employed to remove the button 80 from the passageway 81.

It should be understood, of course, that the specific forms of the invention illustrated and described therein are intended to be representative only, as certain changes and modifications may be made without departing from the scope of the teachings herein disclosed. Accordingly, reference should be made to the appended claims in ascertaining the full scope of the invention.

What is claimed is:

1. In an open face spinning reel used for casting a bait attached to a fishing line and for retrieving the bait and fishing line after casting, the reel having a housing, a center shaft mounted in the housing, a spool mounted on the shaft for holding the fishing line, a handle and drive gear mounted on the housing, a pinion assembly with a ratchet means coaxially mounted partially surrounding the shaft, located substantially within the housing and in operable engagement with the drive gear, a rotor mounted on the pinion assembly and rotatable by cooperative movement of the handle, drive gear and pinion assembly, a movable bail mounted on the rotor having an open casting position and a closed retrieving position, self-centering bail means mounted in the housing including a lever arm having a pawl end and a back end and being movable between a first position where the pawl can be in contact with the ratchet means the second position where the pawl does not contact the ratchet means, the housing having a back plate section spaced from the arm, the section having an upper and outer surface and a lower and inner surface, a rectangular passageway located between the two surfaces, first and second long sides of the rectangular passageway, the first side having first and second recesses extending between the two surfaces, means for moving the back end of the lever arm back and forth from the second position to the first position comprising:
   (a) a button slidably mounted in the passageway having a head mounted exterior of the upper surface and a lower portion having a top secured to the head and a base projecting through the passageway;
   (b) the lower portion having:
      (1) first and second longitudinal spaced walls,
      (2) wedge means mounted on the first wall;
      (3) cantilever arm means mounted on the second wall, and
      (4) nib means mounted on the arm means near the head within said passageway and projecting outwardly from the arm,
   (c) first means for retaining the button in:
      (1) a first position by cooperative engagement of the nib means in the first recess, and
      (2) a second position by cooperative engagement of the nib means in the second recess; and
   (d) second means for retaining the button in the passageway.

2. In the reel of claim 1, wherein in the passageway the distance between the first and second sides is "A," the distance between the second side and the first recess is "B," the distance between the second side and the second recess is substantially "B" and "B" is greater than "A."

3. In a plate having spaced upper and lower surfaces and a rectangular passage between the two surfaces, first and second long sides of the rectangular passage, the first side having spaced first and second recesses extending between the two surfaces, a button slidably mounted in the passageway comprising:
- (a) a head mounted exterior of the upper surface;
- (b) a lower portion having a top secured to the head and a base projecting through the passageway, the portion having first and second longitudinal spaced walls, wedge means mounted on the first wall, cantilever arm means mounted on the second wall and nib means mounted on the arm means near the head and projecting outwardly from the arm;
- (c) means for maintaining the nib in contact with the first side of the passageway;
- (d) first means for retaining the button in:
  - (1) a first position by cooperative engagement of the nib means in the first recess, and
  - (2) a second position by cooperative engagement of the nib means in the second recess; and
- (e) second means for retaining the button in the passageway.

4. In the plate of claim 3, wherein in the passageway the distance between the first and second sides is "A," the distance between the second side and the first recess is "B," the distance between the second side and the second recess is substantially "B" and "B" is greater than "A."

5. In an open face spinning reel used for casting a bait attached to a fishing line and for retrieving the bait and fishing line after casting, the reel having a housing, a center shaft mounted in the housing, a spool mounted on the shaft for holding the fishing line, a handle and drive gear mounted on the housing, a pinion assembly with a ratchet means coaxially mounted partially surrounding the shaft, located substantially within the housing and in operable engagement with the drive gear, a rotor mounted on the pinion assembly and rotatable by cooperative movement of the handle, drive gear and pinion assembly, a movable bail mounted on the rotor having an open casting position and a closed retrieving position, self-centering bail means mounted in the housing including a lever arm having a pawl end and a back end and being movable between a first position where the pawl can be in contact with the ratchet means the second position where the pawl does not contact the ratchet means, the housing having a back plate section spaced from the arm, the section having an upper and outer surface and a lower and inner surface, a rectangular passageway located between the two surfaces, first and second long sides of the rectangular passageway, the first side having first and second catch means extending between the two surfaces, means for moving the back end of the arm back and forth from the second position to the first position comprising:
- (a) a button slidably mounted in the passageway having a head mounted exterior of the upper surface and a lower portion having a top secured to the head and a base projecting through the passageway;
- (b) the lower portion having:
  - (1) first and second longitudinal spaced walls,
  - (2) wedge means mounted on the first wall,
  - (3) yieldably retractable cantilever arm means mounted on the second wall, and
  - (4) coupler means mounted on the arm means near the head and projecting outwardly from the arm,
- (c) first means for retaining the button in:
  - (1) a first position by cooperative engagement of the coupler means in the first catch means, and
  - (2) a second position by cooperative engagement of the coupler means in the second catch means; and
- (d) second means for retaining the button in the passageway.

6. In the reel of claim 5, wherein in the passageway the distance between the first and second sides is "F," the distance between the second side and the first catch means is "E," the distance between the second side and the second catch means is substantially "E" and "F" is greater than "E."

7. In a plate having spaced upper and lower surfaces and a rectangular passage between the two surfaces, first and second long sides of the rectangular passage, the first side having spaced first and second catch means extending between the two surfaces, a button slidably mounted in the passageway comprising:
- (a) a head mounted exterior of the upper surface;
- (b) a lower portion having a top secured to the head and a base projecting through the passageway, the portion having first and second longitudinal spaced walls, wedge means mounted on the first wall, cantilever arm means mounted on the second wall and coupler means mounted on the arm means near the head and projecting outwardly from the arm;
- (c) means for maintaining the coupler means in contact with the first side of the passageway;
- (d) first means for retaining the button in:
  - (1) a first position by cooperative engagement of the coupler means in the first catch means, and
  - (2) a second position by cooperative engagement of the coupler means in the second catch means; and
- (e) second means for retaining the button in the passageway.

8. In the plate of claim 7, wherein in the passageway the distance between the first and second sides is "F," the distance between the second side and the first catch means is "E," the distance between the second side and the second catch means is substantially "E" and "F" is greater than "E."

9. In a plate having spaced upper and lower surfaces and a rectangular passage between the two surfaces, first and second long sides of the rectangular passage, extending between the two surfaces, a button slidably mounted in the passageway comprising:
- (a) a head mounted exterior of the upper surface;
- (b) a lower portion having a top secured to the head and a base projecting through the passageway, the portion having first and second longitudinal spaced walls, wedge means mounted on the first wall, step means mounted between the head and the wedge means, cantilever arm means mounted on the second wall and plane means mounted on the arm means near the head and projecting outwardly from the arm;
- (c) first means for maintaining the plane means in contact with the first side of the passageway;
- (d) friction means for retaining the button in any preselected position by cooperative engagement of the plane means in contact with the first long side and step means in contact with the second long side;

(e) second means for retaining the button in the passageway.

10. The button of claim 1 wherein the lower portion has a substantially U-shaped configuration with the bend of the "U" comprising the base and the "U" defining an opening between the top and the base.

11. The button of claim 1 wherein the arm means is resiliently connected to the lower portion.

12. The button of claim 11 wherein the arm means functions in part as a cantilever spring.

13. The button of claim 1 wherein the arm means is integral with the lower portion.

14. The button of claim 5 wherein the arm means is integral with the lower portion.

15. The button of claim 13 wherein the arm means has a "J" shaped cross-sectional configuration, the "J" having a foot portion secured to the base and a leg portion projecting toward the top.

16. The button of claim 15 wherein the leg has internal and external areas, the internal area adjacently spaced from the second wall and the external area projecting outwardly from the second wall.

17. The button of claim 16 wherein the exterior area defines a longitudinal side rail substantially parallel to the top.

18. The button of claim 17 wherein the rail has an upper tapered face directed toward the head and the leg has a small plane secured to the upper taper, the plane facing outwardly from the lower portion and closer to the second wall than the rail.

19. The button of claim 18 wherein the nib means is secured to the small plane and the upper taper.

20. The button of claim 19 wherein the distance between the outwardly projecting nib means and the first wall is "C" and the distance "C" is equal to or greater than the distance "B."

21. The button of claim 20 wherein the wedge means is substantially parallel to the top.

22. The button of claim 21 wherein the wedge means has upper and lower wedge faces defining an edge that is substantially parallel to the top and to the rail and projecting outwardly from the first wall.

23. The button of claim 22 wherein the distance between the edge and the rail is "D" and the distance "D" is greater than the distances "A," "B," "C."

24. The button of claim 22 wherein the lower surface of the second side defines a seat.

25. The button of claim 1, 2, 3, or 4 wherein the nib means is depressed toward the second wall when the button slides back and forth from the first position to the second position.

26. The button of claim 23 wherein when the nib means is depressed towards the second wall, the upper wedge is in contact with the seat.

27. The button of claim 26 wherein the first means comprises the operative relationship of the upper wedge face in contact with the lower surface of the second side and the resilient mounting of the arm means urging the nib means outwardly from the second wall whereby the nib means is received in the first and second recesses firmly.

28. The button of claim 27 wherein the second means comprises the in situ position of the button in the passageway with the distance "D" being greater than "A."

29. The button of claim 2, or 4 wherein the button can be removed from the plate after the arm means is depressed towards the second wall until the distance between the edge and the rail is about "A."

30. The button of claim 24 wherein the upper wedge face has a slight undercut adjacent the seat.

31. The button of claim 1, 3, 5, or 7 wherein the nib means has a partially cylindrical shape.

32. The button of claim 10 wherein the wedge comprises two sections each substantially parallel to the top and located on each part of the U-shape.

33. The button of claim 32 wherein each section has upper and lower wedge faces defining an edge.

34. The button of claim 33 wherein each upper wedge face has a slight undercut.

35. The button of claim 1 or 9 wherein the base has an exterior surface defining a cam.

36. The button of claim 1, wherein the base has an exterior surface defining a cam that is in cooperative association with the back end of the lever arm.

37. The device of claim 1 or 3 wherein the passageway has a plurality of recesses providing at least a first, second or third position.

38. The button of claim 5 wherein the arm means is depressed toward the second wall when the button slides back and forth from the first position to the second position.

39. The button of claim 38 wherein when the arm means is depressed toward the second wall, the upper wedge is in contact with the seat.

40. The reel of claim 5 wherein the passageway has a plurality of catches providing at least first, second and third positions.

41. The plate of claim 7 or 8 wherein the passageway has a plurality of catches providing at least first, second and third positions.

42. The plate of claim 9 wherein the button has a plurality of positions in the passageway.

43. An open face spinning reel having a housing, selectively operable means in said housing controlled by a movable button operable externally of the housing, and means for mounting said button on said housing for retention in one or more selected positions including a passageway formed in the wall of the housing, said button having a head mounted exteriorly of the housing and a lower portion with a base projecting through the passageway, the lower portion having first and second walls extending lengthwise thereof, wedge means on said first wall having a surface underlying and engageable with the interior of the housing wall along one side of the passageway, arm means connected to the second wall and yieldably extending outwardly away from said second wall toward a second side of the passageway opposite said one side with a part positioned in and urged toward said second side of the passageway and an angled surface adjacent and underlying the interior of the housing wall along said second side of the passageway, and coacting means on said part and the surface of said passageway for holding the button in a selected position and releasable by yielding of said arm means.

44. A structure as defined in claim 43 wherein said lower portion is formed of molded plastic material providing a resilient connection of the arm means thereto.

45. A structure as defined in claim 43 wherein said angled surface of the arm means is adjacent the upper end thereof and said upper end is spaced from said second wall a distance sufficient to permit adequate movement of the arm means toward the second wall to have the distance between the first wall surface and the angled surface of the arm means less than the width of the passageway for button removal from or button mounting on the housing.

* * * * *